H. M. ROSE,

Assignor to G. C. BAKER.

BARBED FENCE WIRE.

No. 9,798. Reissued July 12, 1881.

Witnesses:
Laura L. Rose
George L. Rose

Inventor:
Henry H. Rose

N. PETERS, Photo-Lithographer, Washington, D. C.

UNITED STATES PATENT OFFICE.

HENRY M. ROSE, OF WATERMAN, ILLINOIS, ASSIGNOR TO GEORGE C. BAKER, OF DES MOINES, IOWA.

BARBED FENCE-WIRE.

SPECIFICATION forming part of Reissued Letters Patent No. 9,798, dated July 12, 1881.

Original No. 198,688, dated December 25, 1877. Application for reissue filed June 3, 1881.

*To all whom it may concern:*

Be it known that I, HENRY M. ROSE, of Waterman, in the county of De Kalb and State of Illinois, have invented a new and useful Improvement in Barbed-Wire Fences, of which the following is a full and complete description, reference being had to the accompanying drawings, making a part of this specification, in which—

Figure 1:
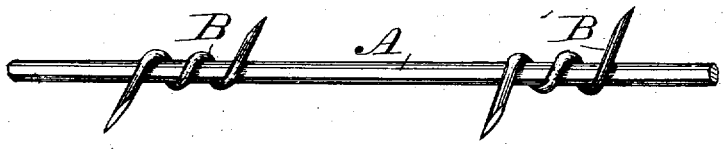
Figure 2:
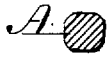

Figure 1 is a perspective view, showing the wire with barbs attached. Fig. 2 is a cross-section of the wire.

The object of my invention consists in combining with a polygonal-shaped wire a barb constructed in such a manner that it will not be liable to change its position on the wire, and less liable to fracture than if the spirals were wound close together when being put upon the main wire. It is also less liable to retain moisture between the barb and wire, thereby increasing its durability, as will be hereinafter more fully described.

*a* is a polygonal wire, having four or more sides, preferably made so as to have four flat and four curved sides, the flat and curved sides alternating with each other, so that it has the appearance of having been a round wire, of which a portion of its surface has been compressed or flattened, producing the alternate flat sides.

The wire may be made in the form above described, either by drawing it through a die of the polygonal form, or by passing a round wire between two or more rollers so adjusted as to produce the desired form.

*b* is a wire barb, wound spirally around the wire *a*, and made to conform thereto, so as to prevent the barb from turning or twisting upon the wire *a*.

In winding the barb upon the wire *a*, as above set forth, each turn of the spiral is placed at a distance of one-fourth of an inch (more or less) from the one which precedes or succeeds it, in order to give the barb a greater lateral bearing, thus preventing any swaying or swinging motion that the barb would have if the spirals were made without any space between the threads, and likewise diminishing the liability of the barb to turn or shift its position in any manner on the wire *a*.

The barb *b* is also well adapted to be used on a round wire, the length of its bearing giving it a greater stability on the wire than if the spirals were wound close together.

Having thus described my invention, I claim as new and useful and desire to secure by Letters Patent—

1. The combination of barbs with a wire of a polygonal form, for the purposes set forth.

2. The combination of barbs with a square or four-sided wire, for the purposes set forth.

3. In combination with a fence-wire, the barbs *b*, wound spirally thereon, each turn or coil of the spiral being separated from the one which precedes or succeeds it, substantially as and for the purpose set forth.

HENRY M. ROSE.

Witnesses:

J. A. GILES,

R. HUMPHREY.